July 14, 1936.  J. B. PICARD  2,047,490

STRAIGHT LINE PUMPER

Filed Oct. 26, 1935  3 Sheets—Sheet 1

INVENTOR
John B. Picard,
BY Edward A. Lawrence.
his ATTORNEY

July 14, 1936.  J. B. PICARD  2,047,490
STRAIGHT LINE PUMPER
Filed Oct. 26, 1935  3 Sheets-Sheet 2
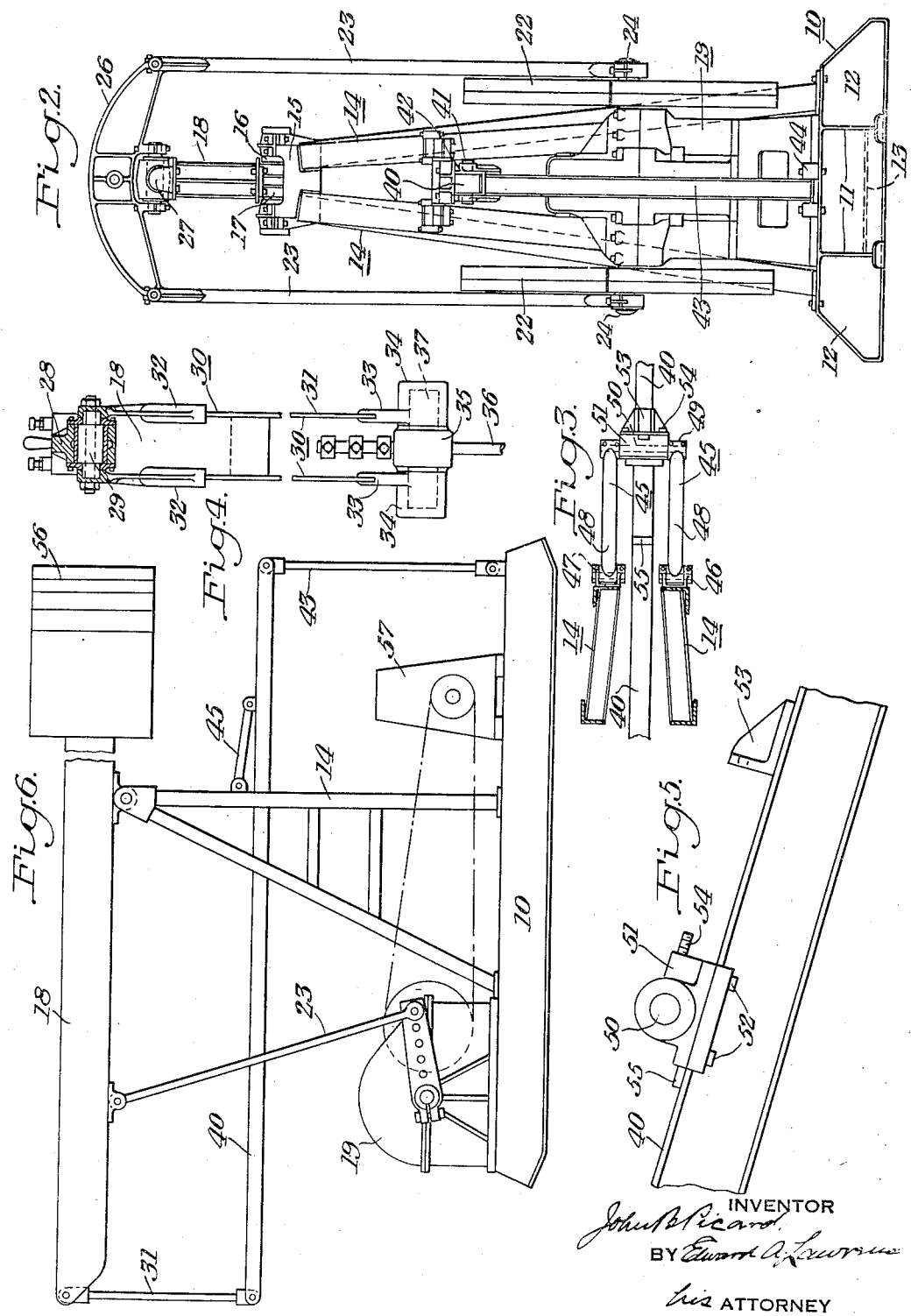

July 14, 1936.   J. B. PICARD   2,047,490
STRAIGHT LINE PUMPER
Filed Oct. 26, 1935   3 Sheets-Sheet 3
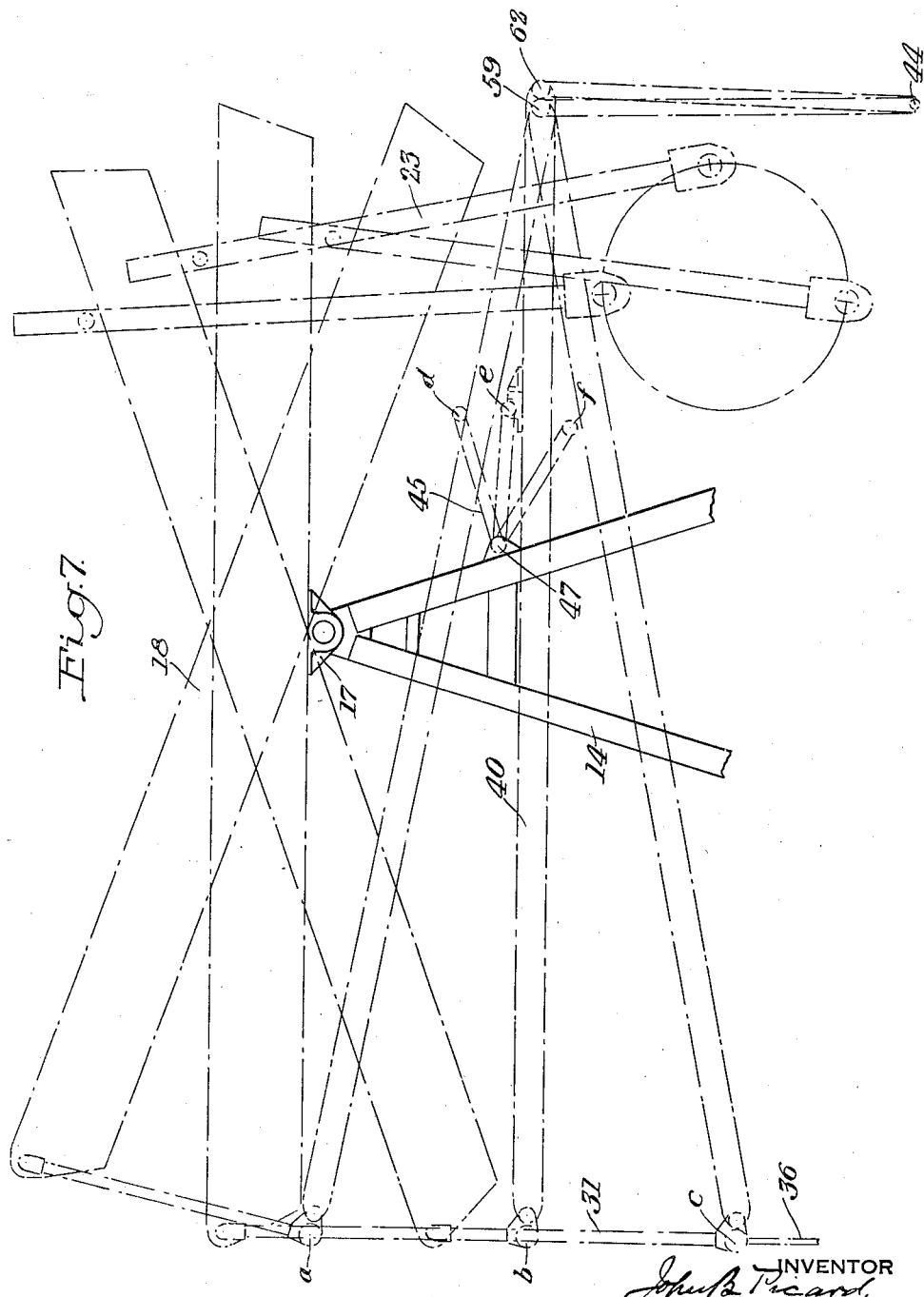

Patented July 14, 1936

2,047,490

UNITED STATES PATENT OFFICE 2,047,490

STRAIGHT LINE PUMPER

John B. Picard, Toledo, Ohio, assignor to The National-Superior Company, Toledo, Ohio, a corporation of Delaware Application October 26, 1935, Serial No. 46,950

7 Claims. (Cl. 74—103)

My invention relates to pumping mechanism for wells, such for instance as oil wells, and the general object in view is the obtaining of straight line motion of the pump rod, usually termed the "polish rod" or "sucker rod".

Thus the general object in view is the alteration of the arcuate movement, imparted by the oscillating power element, such as a walking beam, to provide straight line movement of the element to be reciprocated, such as the polish rod.

The invention is advantageously applicable to standard rig pumping apparatus, pumping powers, pumping jacks and other forms of well-pumping mechanism wherein an oscillating walking beam is employed.

In the well-pumping art, an early form of connection between the walking beam and the polish rod was the direct pivotal attachment of the rod to the beam, sometimes termed "single point suspension". In such case the polish rod is flexed between the packing at the upper end of the well barrel and the end of the walking beam owing to the arcuate path in which the latter moves. This results in undue wear on the packing, causing leakage. This wear is increased in the case of deep wells where the loads carried by the polish rod are great and the pump strokes are longer.

An early attempt to correct this fault involved the mounting of an arcuate guide on the end of the walking beam which is engaged by chains or cables, the lower ends of which are attached to the polish rod. This type of mechanism, popularly referred to as a "horse head", while effecting an improvement in the direction of straight line motion of the polish rod, proved ineffective in the case of deep well pumping or where the loads were relatively heavy. Where chains were used excessive wear occurred between the interlaced links and between the links and the arcuate guide and there was no practical manner of properly lubricating the wearing surfaces. Where cables were used, instead of chains, due to flexing the former broke frequently and required replacement.

A later development was that known as the single link or two point suspension wherein the upper end of the polish rod was connected by a link or twin links to the end of the walking beam, which link or twin links engaged an abutment on the walking beam as the latter moved upwardly, thus substituting two arcs of movement for the single arc of the single point suspension, the deflection of the polish rod being measured by the shorter rise of the two arcs. This was an improvement over the single point suspension as it to a degree approximated straight line motion; and was also an improvement over the horse head type of suspension because the two point suspension was more rigid and made possible better lubrication of moving parts.

A still later development is the three point suspension or double link type wherein the upper end of the upper link is pivotally connected to the end of the walking beam and its lower end pivotally connected to the upper end of the lower link, the lower end of which latter is pivotally connected to the polish rod, the lower portions of the links in turn engaging an abutment on the walking beam as the latter moves upwardly.

In the last mentioned type a three arc movement is obtained, thus effecting a closer approximation to straight line movement than with the single link type of suspension.

The double link suspension has proved highly satisfactory and materially reduces the deflection of the polish rod, but it is not so efficient in the more recently developed pumping units designed to give extremely long strokes.

In the present invention, the principal object in view is to obtain substantial straight line movement of the polish rod by the provision of a type of mechanism capable of arriving at the desired result especially in extremely long stroke pumping, and also which is free from the mechanical faults of previous types of suspension such, for instance, as those characteristic of the horse head type.

I obtain these results by the use of a mechanism comprising a single link or twin links pivotally connecting the polish rod to the walking beam and an oscillating bar mounted independently of the walking beam and pivotally connected to the upper end of the polish rod and the movements of which, caused by the travel of the polish rod, are so controlled as at all times to retain the polish rod in a straight line or vertical path.

In the accompanying drawings, wherein I have illustrated a practical embodiment of the principles of my invention, without however limiting the scope of the latter, Fig. 1 is a side elevation of a pumping power to which my invention is applied.

Fig. 2 is a rear elevation of the same looking from the right in Fig. 1.

Fig. 3 is a view in section taken along the line 3—3 of Fig. 1.

Fig. 4 is an enlarged detail of the polish rod connection with the suspension links, looking from the left in Fig. 1.

Fig. 5 is a fragmentary side elevation of the secondary beam shown retracted with the links disconnected therefrom.

Fig. 6 is a side elevation, similar to Fig. 1, but showing a different application of power to the walking beam.

Fig. 7 is a diagrammatic view in side elevation illustrating the relative position of the elements in different parts of the pumping stroke.

Figure 1:
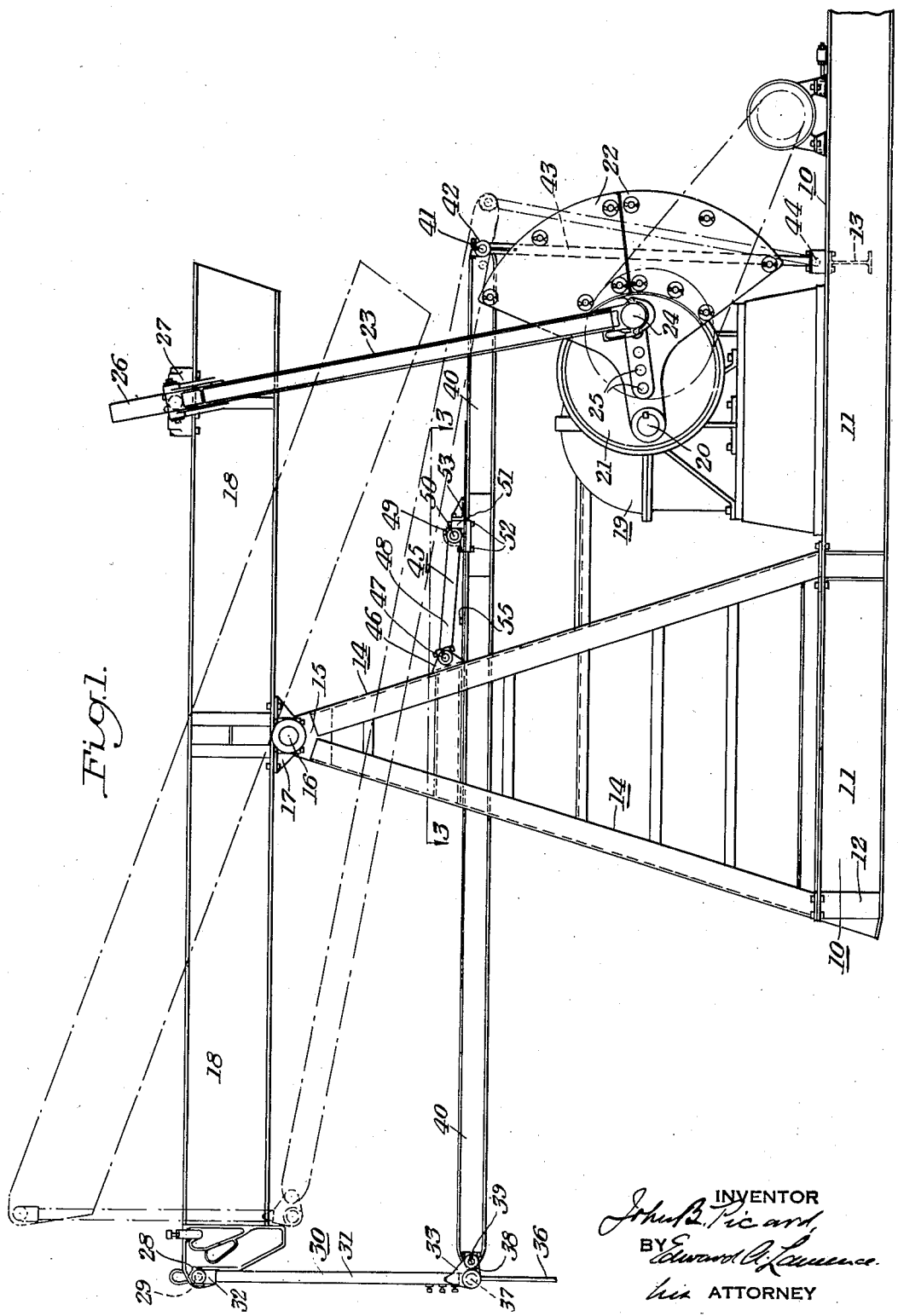

Referring to the drawings, 10 represents the base of the pumping power illustrated as comprising the parallel longitudinal members 11, front cross beam 12 and rear cross beam 13.

14 represents opposed supporting frames shown as of the A-type rising from the base and converging upwardly. 15 represents a double fulcrum bearing in which are journaled the end portions of the fulcrum pin 16 upon the intermediate portion of which is fixedly mounted the saddle 17 to the flat upper surface of which the walking beam 18 is secured, so that the walking beam may oscillate with the pin 16 as its axis of movement.

19 represents a power transmitting unit mounted on the base 10 in the rear of the frames and having the crank shaft 20 extending on each side thereof. The crank shaft may be rotated by a motor through a belt drive and gear reduction unit as shown.

21 represents eccentric crank disks secured to the shaft 20 and provided with the adjustable counterweights 22. 23 represents a pair of pitmans secured at their lower ends by means of universal joints to the crank pins 24 which may be secured in any of the holes 25 of the eccentric disks 21.

The upper ends of the pitmans are pivotally secured to the cross yoke 26 which in turn is secured to the walking beam 18 through the universal joint member 27. Thus the walking beam 18 may be oscillated by the double pitman structure which in turn is operated by the eccentric cranks on the rotary crank shaft 20.

The front end of the walking beam 18 is provided with the bearing 28 through which extends the pin 29 which supports the suspension link structure 30. In the embodiment illustrated the suspension link structure 30 comprises the flat rein members 31 which are fixed as by welding at their upper ends to the bearing members 32 journaled on the ends of the pin 29. The lower ends of the reins 31 are fixed as by welding to the web members 33 of the casting 34. 35 represents a polish rod grip arranged to support the polish rod 36 and which has the opposed trunnions 37 journaled in suitable bearings in the casting 34.

It is obvious that the suspension connection 30 may be of any construction providing sufficient flexibility to permit the change of direction of movement from arcuate to straight line, such, for instance, as a flexible cable or chain.

The web members 33 of the casting 34 are triangular in shape as shown in Fig. 1 and the rear portions thereof are provided with the split bearings 38 arranged to receive the ends of the pin 39 whose intermediate portion is journaled in a bearing carried by the end of the secondary beam 40. The rear end of the secondary beam 40 has journaled therein the pin 41, the ends of which extend beyond each side of the beam and are held in the split bearings 42 carried by the upper end of the rocker post 43, as shown in Fig. 2. The lower end of the post is pivotally mounted as at 44 on a horizontal axis on the cross beam 13.

It will be understood that any suitable means for permitting a substantially horizontal movement of the rear end of the secondary beam may be employed, such, for instance, a sliding guide bearing.

Thus the secondary beam is pivotally secured at its front end to the upper end of the polish rod and at its rear end to the rocker post, and thus is oscillated by the up and down movement of the polish rod in response to the oscillation of the walking beam.

I maintain the polish rod in a vertical path of movement by the provision of means to control the oscillation of the secondary beam so that it moves longitudinally in such a manner as to resist the influence of the walking beam tending to deflect the polish rod from a vertical path.

As a practical form of such control for the movement of the secondary beam 40, I provide a guiding link structure generally designated as 45 and comprising split bearings 46 carried by the supporting frames 14 in which are journaled the ends of transversely disposed pins 47 upon which are clamped the split collars on the front ends of the twin links 48 whose rear ends are provided with split bearings 49 in which are journaled the protruding ends of a cross pin 50 carried by a bracket 51 which in turn is slidably mounted on the secondary beam 40, the bracket being provided with depending lips or flanges to grasp the top flange of said beam. 52 represents plate bolts for securing the bracket 51 to the underlying top flange of the beam 40 to enable the bracket to be clamped fixedly to the beam.

53 represents an abutment member fixed on the upper surface of the beam 40 and provided with holes through which may extend the stud bolts 54 carried by the bracket 51 so that the bracket may be bolted to the abutment and thus fixed relative to the beam. Thus if said bolts 52 and 54 be released, the secondary beam 40 may be retracted toward the right from its operative position shown in Fig. 1, the bracket 51 sliding along the beam as the latter is retracted. To limit the retractive movement of the secondary beam, the top surface of the same is provided with a fixed lug 55 which acts as an abutment to be engaged by the slidable bracket 51 and thus limit the rearward or retractive movement of the secondary beam.

Referring now to Fig. 6, I therein show a modification wherein the power transmitting unit 19 is mounted on the base 10 in front of the supporting frames 14 and the pitmans 23 are arranged to lift the front end of the walking beam 18 instead of pulling down on the rear end of the latter as in the preceding views. Weights 56 may be mounted on the rear end of the beam 18 to counterbalance the weight of the polish rod. 57 represents the source of power for operating the transmitting unit 19.

The length of the suspension link structure 31 and the rocker post 43 may be determined when the secondary beam 40 is substantially parallel to the walking beam 18 and when the latter is in its substantially horizontal or mid-stroke position as shown in Fig. 1. It is preferable that the rocker post 43 be sufficiently long to produce a relatively small rise in the arcuate movement of the pin 41. Theoretically the pin 41 should move in a horizontal plane.

When the apparatus is in its mid-stroke position the secondary beam is in its rearmost position and it is maintaining the sucker rod 36 in the vertical line a, b, c, by means of the link structure 45, as shown in Fig. 7.

The free ends of the links 48, of the link structure 45, are pivotally attached to the secondary beam at a point which is practical and convenient in manufacturing the device. As the secondary beam is oscillated this pivotal point must maintain the polish rod 36 in the same vertical line. Thus when the pumping unit is at the upper, intermediate or lower position of its stroke, the polish rod is in the same vertical line a, b, c at these three positions, and the axes of the pin 51, or the pivotal beam connection to the link structure, scribes an arc through the three points shown on Fig. 7 as d, e and f. The arc d, e, f represents three points on a circle the radius of which is the distance between the pivotal points of the link structure 45. Owing to the fact that in the structure illustrated the axis of the pin 51 does not intersect the neutral axis of the secondary beam 40, but lies above it, the fixed pivotal connection of the link structure 45, or the axes of the pin 47, lies above the horizontal plane of the neutral axes of the secondary beam when in the mid-stroke position as shown in Fig. 1. This condition also illustrates the flexibility of the straight line motion mechanism in adapting it to walking beams provided with different types of supports.

In operation the walking beam 18 oscillates through an arc above its horizontal position approximately equal to the arc of movement below its horizontal position. As the beam lever arm, which extends from fulcrum pin 16 to bearing pin 29, is at an angle from and above horizontal when the beam is in its horizontal position, the greatest deviation of the bearing pin 29, which supports the upper end of suspension link 30, from the vertical axis of the polish rod occurs at the upper end of the operating stroke as shown in Fig. 7.

The link structure 45, which regulates the longitudinal movement of the secondary beam 40, is pivotally connected to the A frame 14 above the secondary beam. Therefore, the arc of movement above horizontal of said link structure 45 is less when the secondary beam moves above its horizontal position than the arc of movement of the link structure 45 below horizontal when the secondary beam 40 moves through an equal arc below its horizontal position.

The force required by the walking beam 18 to set in motion the polish rod at or near the beginning of the up-stroke is greater than that required to sustain the rod in motion throughout the balance of the up-stroke. In the arrangement illustrated on the drawings the lateral deviation of the bearing 29 at the upper end of the suspension link, from the vertical axis of the polish rod, is at a minimum at the beginning of the up-stroke.

At this position in the cycle of operation the stress imposed upon the link structure 45 for regulating the longitudinal movement of the secondary beam, is at a minimum although the load sustained by the walking beam at this instant is greatest.

At the upper end of the pumping or operating stroke the bearing 29 at the upper end of the suspension link 30 is at its position of maximum deviation from the vertical axis of the polish rod. At this point the force required by the walking beam 18 to sustain the load is considerably less than at the beginning of the up-stroke.

At this point of the operating cycle the angle of deviation from horizontal of the link structure 45 is less than its angle below horizontal or when the walking beam 18 is at the bottom of its operating stroke.

Therefore, the stress set up in the link structure 45 at the upper end of the operating stroke is not excessive as the reduced arc of movement and the reduced imposed load on the walking beam 18 compensates for the increased stress that would otherwise be set up due to the greater deviation or displacement of the upper suspension link bearing 29 from the vertical axis of the polish rod.

The use of this arrangement results in the reduction of stress in the members, thereby permitting the employment of lighter members to sustain the substantial loads imposed.

It is evident that certain advantages are obtained by the arrangement disclosed. However, it is obvious that changes in the structure may be made without deviating from the spirit of the invention. For example, the polish rod suspension point on the walking beam may be in the same horizontal plane as that of the fulcrum point of the beam; and/or the beam may be so positioned relative to the well to provide for the same deviation of the suspension point from the vertical axis of the polish rod at the upper and lower limits of the stroke. On the other hand the mid-stroke position of the suspension point on the walking beam could be arranged to deviate on the other side from the vertical axis to the same degree.

It is evident that if the link structure of the secondary beam is so mounted or to be disposed in the plane of the longitudinal axis of the secondary beam when the latter is horizontal the arc of movement of the free end of the link structure will be equal above and below the horizontal as the walking beam oscillates and the polish rod reciprocates.

It is quite evident that the flexibility of this device may be advantageously employed to suit the conditions required. Thus the link structure may be mounted on an independent support or be replaced by an arcuate cam or by any other mechanism adapted to provide the proper movement of the secondary beam and either structure may be provided with an independent support.

I claim:

1. In a straight line lift device for use with a walking beam, the combination of a suspension link having one end connected to the walking beam, a secondary beam having one end connected to the other end of the suspension link, means including a link structure connecting the secondary beam to a fixed point for regulating the movement of the secondary beam to maintain the last mentioned end of the link in a straight line path of movement.

2. In a straight line lift device for use with a walking beam, the combination of a suspension link having one end connected to the walking beam, a secondary beam having one end connected to the other end of the suspension link, means including a link structure connecting the secondary beam to a fixed point for regulating the movement of the secondary beam to maintain the last mentioned end of the link in a straight line path of movement, and means for retracting the secondary beam and the last mentioned end of the suspension link away from said path of movement.

3. In a straight line pumping device, the combination with a support, of a walking beam pivotally mounted on said support for oscillation, a link pivotally connected to said support below the walking beam, a secondary beam pivotally connected intermediate of its ends to the free end of said link, means permitting longitudinal movement for supporting one end of the secondary beam, and a hanger link connecting the other end of the secondary beam with the adjacent end of the walking beam and arranged to carry the pumping load while its lower end is held in a straight line path of movement by the secondary beam.

4. In a straight line pumping device, the combination with a support, of a walking beam pivotally mounted on said support for oscillation, a link pivotally connected to said support below the walking beam, a secondary beam pivotally connected intermediate of its ends to the free end of said link, a second link having one end pivotally connected to one end of the secondary beam and its lower end pivotally supported at its base, and a hanger link connecting the other end of the secondary beam with the adjacent end of the walking beam and arranged to carry the pumping load while its lower end is held in a straight line path of movement by the secondary beam.

5. In a straight line pumping device, the combination with a support, of a walking beam pivotally mounted intermediate of its ends on said support for oscillation, a link pivotally connected to said support below the walking beam, a secondary beam pivotally connected intermediate of its ends to the free end of said link, and a substantially vertical second link having its upper end pivotally connected to one end of the secondary beam and pivotally supported at its lower end, and a hanger link connecting the other end of the secondary beam with the adjacent end of the walking beam and arranged to carry the pumping load while its lower end is held in a straight line path of movement by the secondary beam.

6. In a straight line pumping device, the combination of a beam, means for supporting one end of said beam to permit longitudinal movement of the latter, means connected to said beam intermediate of its ends to confine the movement of the beam to a predetermined vertical arcuate path, a walking beam arranged for oscillation, and a hanger link having its upper end pivotally connected to the walking beam and supporting the pumping load therefrom and having its lower end pivotally connected to the other end of the first mentioned beam.

7. A straight line motion device for connection with the lower end of a hanger link supporting the pumping load from an oscillating walking beam, the combination of a link pivotally connected to a support below the walking beam, a secondary beam pivotally connected intermediate of its ends to the free end of said link and having one end connected to the lower end of the hanger link, and means permitting longitudinal movement for supporting the other end of said secondary beam.

JOHN B. PICARD.